United States Patent [19]

Sydansk

[11] Patent Number: 5,307,878
[45] Date of Patent: May 3, 1994

[54] POLYMER ENHANCED FOAMS FOR REDUCING GAS CONING

[75] Inventor: Robert D. Sydansk, Littleton, Colo.

[73] Assignee: Marathon Oil Company, Findlay, Ohio

[21] Appl. No.: 1,484

[22] Filed: Jan. 7, 1993

[51] Int. Cl.$^5$ .............................................. E21B 43/32
[52] U.S. Cl. ................... 166/305.1; 166/371; 166/309
[58] Field of Search ............... 166/305.1, 279, 309, 166/371

[56] References Cited

U.S. PATENT DOCUMENTS

| | | | |
|---|---|---|---|
| 3,368,624 | 2/1968 | Heuer, Jr. et al. | 166/309 X |
| 3,379,260 | 4/1968 | O'Brien | 166/309 X |
| 3,393,738 | 7/1968 | Bernard et al. | 166/309 X |
| 4,676,316 | 6/1987 | Mitchell | 166/274 |
| 5,105,884 | 4/1992 | Sydansk | 166/270 |
| 5,129,457 | 7/1992 | Sydansk | 166/274 |

OTHER PUBLICATIONS

Albrecht, R. A., et al., "Foams as Blocking Agents in Porous Media", SPE Journal, Mar. 1970.

Rossen, W. R., "Theories of Foam Mobilization Pressure Gradient", SPE Paper, Apr. 17, 1988.

Hanssen, J. E., et al., "Foams for Effective Gas Blockage in the Presence of Crude Oil", SPE Paper, Apr. 22, 1990.

Krause, R. E., et al., "Foam Treatment of Producing Wells to Increase Oil Production at Prudhoe Bay", SPE Paper, Apr. 22, 1992.

Persoff, P., et al., "Aqueous Foams for Control of Gas Migration and Water Coning in Aquifer Gas Storage", Energy Sources, 1990.

Primary Examiner—Stephen J. Novosad

[57] ABSTRACT

A process is provided for reducing the inhibiting effect of gas coning on liquid hydrocarbon production into a production wellbore penetrating a subterranean formation having a gas cap overlying a liquid hydrocarbon producing zone in fluid communication with the gas cap. A polymer enhanced foam containing a polymer, an aqueous solvent, a surfactant, and a gas is placed in gas-permeable anomalies or matrix between the production wellbore and gas cap, thereby effectively blocking the downward flow of gas from the gas cap to the production wellbore and enabling desirable liquid hydrocarbons to more readily enter the wellbore for production to the surface.

20 Claims, 2 Drawing Sheets

POLYMER ENHANCED FOAMS FOR REDUCING GAS CONING

BACKGROUND OF THE INVENTION

1. Technical Field

The present invention relates to a process for recovering liquid hydrocarbons from a production wellbore in fluid communication with a subterranean hydrocarbon-bearing formation having a gas cap overlying a liquid hydrocarbon producing zone, and more particularly to such a process wherein a polymer enhanced foam is placed in the formation to reduce gas coning into the production wellbore.

2. Description of Related Art

A specific problem frequently encountered during the recovery of liquid hydrocarbons from an oil-bearing producing zone of a subterranean formation having an overlying gas cap is a phenomenon termed "gas coning". This phenomenon occurs when there is fluid communication between the producing zone and the gas cap. Under sufficient drawdown pressure, the gas cap gas is drawn down and coproduced with the liquid hydrocarbons from the producing zone. Due to the higher mobility of the gas cap gas, the gas also tends to inhibit the flow of liquid hydrocarbons into the wellbore by preferentially entering the wellbore to the exclusion of the liquid hydrocarbons. Accordingly, gas coning is characterized by a significant increase in the gas oil ratio of the produced fluids and an attendant significant decrease in the liquid hydrocarbon recovery rate from the production wellbore.

Gas coning treatments generally rely on placement of a gas blocking agent in the formation between the gas cap gas and the liquid hydrocarbon production wellbore to substantially block vertical flowpaths for the gas into the production wellbore. U.S. Pat. No. 5,105,884 to Sydansk discloses the use of a conventional oilfield foam augmented with a crosslinked polymer gel as a gas blocking agent in vertical fractures extending between a gas cap and a liquid hydrocarbon producing zone affected by gas coning. Although the gel-containing foam is extremely effective for its intended purpose, application of the gel-containing foam has a distinct, albeit minimal, degree of operational complexity and risk. As with any chemical reaction, the crosslinking reaction between the crosslinking agent and polymer requires greater operator attention to process controls to ensure that the reaction proceeds properly. Furthermore, the strength of the resultant foam is such that the foam can be difficult to remove if it is improperly placed in the formation or if one subsequently desires to return the formation to its original permeability condition.

By comparison, conventional foams, typically consisting of only a surfactant solution and a foaming gas, are relatively cheaper and simpler to formulate than gel-containing foams and obviate certain operational complexities, being relatively easy to break down for removal from the formation and not requiring the added process controls and chemical cost of the crosslinking reaction. Nevertheless, the gel-containing foams are deemed superior to conventional oilfield foams for treating gas coning because the performance of conventional foams in the treatment of gas coning has been found inadequate.

Whereas, conventional oilfield foams generally perform satisfactorily as dynamic mobility control fluids in hydrocarbon displacement floods, different performance demands are required of a foam acting as a static gas blocking agent. In this role, conventional oilfield foams often do not have sufficient structural strength, stability, or critical pressure gradient for flow to achieve long-term performance demands when continuously subjected to the gas flow pressure gradient existing during gas coning. Furthermore, conventional oilfied foams often do not have sufficient stability to maintain their structural integrity when subjected to downhole formation conditions typically encountered, particularly in the presence of liquid hydrocarbons.

U.S. Pat. No. 5,129,457 to Sydansk discloses the use of foams augmented with an uncrosslinked polymer for specific hydrocarbon displacement flooding applications. In particular, such foams are disclosed as having utility as mobility-controlling hydrocarbon displacement fluids or as flow diverters for conventional hydrocarbon displacement fluids. Persoff, P. et al., "Aqueous Foams for Control of Gas Migration and Water Coning in Aquifer Gas Storage", *Energy Sources*, v.12, pp. 479-497, 1990, also suggests the use of a foam augmented with a polymer for the narrow application of stabilizing a foam used to block water coning in an underground gas storage aquifer. However, neither of these references recognizes or suggests the potential utility of a foam augmented with an uncrosslinked polymer to treat gas coning in an oil-bearing formation and to overcome the unique problems and complexities attendant therewith. In particular, it was not heretofore believed that a foam augmented solely with an uncrosslinked polymer had sufficient strength and stability to be effective in a gas coning treatment, particularly in the presence of a liquid hydrocarbon.

As is apparent from the above, a gas coning treatment process is needed which employs a gas blocking agent that couples the predictable effectiveness and reliability of a gel-containing foam with the operational simplicity and low cost of a conventional oilfield foam. Accordingly, it is an object of the present invention to provide an alternative gas blocking agent having utility in a gas coning treatment which overcomes the problems encountered with the use of known gas coning treatment agents. It is further an object of the present invention to provide an alternative blocking agent that is economical and operationally simple to apply, yet has a high degree of strength and stability when placed in a formation.

SUMMARY OF THE INVENTION

The present invention is a process utilizing a polymer enhanced foam to sustain or increase the recovery rate of liquid hydrocarbons from a subterranean hydrocarbon-bearing formation via a production wellbore in fluid communication with the formation. The process is specific to a subterranean formation having a gas cap overlying a liquid hydrocarbon producing zone in fluid communication with the gas cap. The polymer enhanced foam is utilized as a gas blocking agent to mitigate the inhibiting effect of gas coning on liquid hydrocarbon production into the production wellbore.

The polymer enhanced foam comprises a polymer, an aqueous solvent, a surfactant, and a gas. The foam is placed in vertical flowpaths made up of gas-permeable matrix or anomalies which provide fluid communication between the gas cap and liquid hydrocarbon production wellbore. The foam effectively blocks the downward flow of gas from the gas cap into the production wellbore and promotes the more desirable production of liquid hydrocarbons via the wellbore to the surface.

DESCRIPTION OF PREFERRED EMBODIMENTS

Figure 1A:
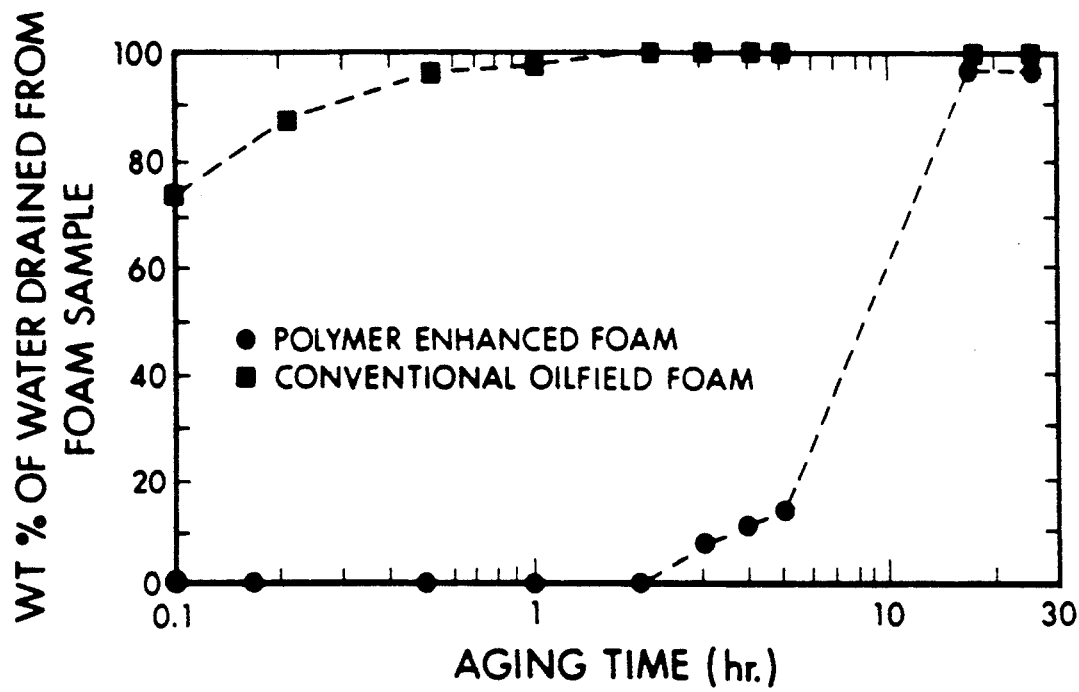
FIG. 1a is a graph comparing the rate of water drainage in a polymer enhanced foam of the present invention and a conventional oilfield foam as described in Example 1.

A number of specific terms are used throughout the specification to describe the process of the present invention and are defined as follows. A subterranean hydrocarbon-bearing formation is a geological structure comprising two general regions, "matrix" and "anomalies." An "anomaly" is a volume within the formation having a very high permeability relative to the remainder of the formation. The term "anomaly" is inclusive of such highly permeable volumes as fractures, fracture networks, joints, cracks, fissures, vugs, voids, solution channels, caverns, washouts, cavities, and the like. The matrix is essentially the remainder of the formation and is generally characterized as substantially continuous, sedimentary geological material having a very low permeability relative to an anomaly. In addition, the matrix is often characterized as competent.

The term "wellbore" is defined herein as a bore hole extending from the earth surface to a subterranean hydrocarbon-bearing formation. Thus, a wellbore is a conduit providing fluid communication between the surface and the formation penetrated thereby. A production wellbore enables the removal of fluids from the formation to the surface and an injection wellbore enables the placement of fluid into the formation from the surface. It is noted that a given wellbore can function interchangeably as a production wellbore or an injection wellbore depending on whether a fluid is being removed from or placed in the wellbore. The term "well" is synonymous with the term "wellbore."

A "foam" is a stabilized gas dispersion maintained within a liquid phase, wherein the dispersed gas phase constitutes at least half of the total volume of the foam. The foam appears as a plurality of gas bubbles separated from one another by stabilized films of liquid. In porous media, such as the formation matrix, the foam may exist as discrete gas bubbles within the pore bodies of the porous medium. The bubbles are separated from one another by lamellae of interfacially stabilized liquid films.

Conventional oilfield foams consist of a foaming gas dispersed in a surfactant solution made up of a surfactant and a solvent. The surfactant acts as a foaming agent to facilitate and stabilize the gas dispersion within the liquid phase. A "polymer enhanced foam" is a specific type of oilfield foam comprising a foaming gas dispersed in an aqueous surfactant solution, wherein the aqueous surfactant solution further includes a polymer dissolved therein. Other terms used herein have the same definitions as ascribed to them in U.S. Pat. No. 5,129,457, incorporated herein by reference, or have definitions in accordance with the conventional usage of a skilled artisan, unless otherwise defined hereafter.

The process of the present invention is performed by generating and placing a polymer enhanced foam within a subterranean hydrocarbon-bearing formation penetrated by a liquid hydrocarbon production wellbore in the specific manner described hereafter. The polymer enhanced foam is generated from a substantially uncrosslinked polymer, an aqueous solvent, a surfactant and a gas. It is important to note that the foam composition is substantially free of any polymer crosslinking agent which could otherwise crosslink the polymer and convert the liquid phase of the foam to a crosslinked polymer gel at some point in the process.

The polymer component of the foam is substantially any water-soluble, viscosity-enhancing polymer that is substantially uncrosslinked. Either a biopolymer or a synthetic polymer has utility herein. Biopolymers having utility herein include polysaccharides and modified polysaccharides, such as xanthan gum, guar gum, succinoglycan, scleroglycan, polyvinylsaccharides, carboxymethylcellulose, o-carboxychitosans, hydroxyethylcellulose, hydroxypropylcellulose, and modified starches.

Synthetic polymers having utility herein include polyvinyl alcohol, polyethylene oxide, polyvinyl pyrrolidone, and acrylamide polymers. Exemplary acrylamide polymers are polyacrylamide, partially hydrolyzed polyacrylamide, acrylamide copolymers containing acrylamide and one other monomeric species, and acrylamide terpolymers containing acrylamide and two other monomeric species, or acrylamide, acrylate, and one other monomeric species. Polyacrylamide (PA) is defined as an acrylamide homopolymer having substantially less than about 1% of its acrylamide groups converted to carboxylate groups. Partially hydrolyzed polyacrylamide (PHPA) is an acrylamide homopolymer having more than about 1%, but not 100%, of its acrylamide groups converted to carboxylate groups. Useful acrylamide polymers are prepared according to any conventional method, but preferably have the specific properties of an acrylamide polymer prepared according to the method disclosed in U.S. Pat. No. Re. 32,114, incorporated herein by reference.

The average molecular weight of an acrylamide polymer having utility herein is generally in a range between about 10,000 and about 50,000,000, preferably between about 250,000 and about 20,000,000, and most preferably between about 1,000,000 and about 15,000,000. The polymer concentration in the liquid phase of the foam is generally at least about 500 ppm, preferably at least about 2,000 ppm, and most preferably within a range between about 3,000 ppm and about 10,000 ppm.

Polymers satisfying the criteria set forth above impart a high degree of stability to a polymer enhanced foam relative to conventional oilfield foams formulated from a foaming gas and a liquid phase containing a surfactant, but lacking polymer enhancement. The polymer enhanced foam better retains its stability when contacted by liquid hydrocarbons within the formation, relative to conventional polymer-free foams that are readily destabilized by hydrocarbon contact. Polymer enhancement of the foam also advantageously increases the structural strength and critical pressure gradient for flow of the foam relative to conventional polymer-free foams. The "critical pressure gradient for flow" is defined herein as the maximum pressure that can be applied to the foam in porous media without foam flow.

The aqueous solvent of the present polymer enhanced foam is substantially any aqueous liquid capable of forming a solution with the selected polymer. The term "solution" as used herein, in addition to true solutions, is intended to broadly encompass dispersions, emulsions, or any other homogeneous mixture of the polymer in the aqueous solvent. The solvent is preferably either a fresh water or a brine, such as a produced water from the subterranean formation. Produced water can be advantageous because of its low-cost availability and because it enables the practitioner to return the produced water to the formation, thereby eliminating disposal thereof.

The surfactant of the polymer enhanced foam is substantially any water-soluble foaming agent suitable for oilfield use that is compatible with the specific polymer selected as will be evident to the skilled artisan. As such, the surfactant can be anionic, cationic or nonionic. A preferred surfactant is selected from the group consisting of ethoxylated alcohols, ethoxylated sulfates, refined sulfonates, petroleum sulfonates, and alpha olefin sulfonates. The concentration of surfactant in the liquid phase of the foam is in a range between about 20 ppm and about 50,000 ppm, preferably between about 50 ppm and about 20,000 ppm, and most preferably at least about 1000 ppm. In general, the performance of the polymer enhanced foam in the method of the present invention is relatively insensitive to the particular species and concentration of the surfactant selected, subject to the above-recited criteria, particularly when the selected polymer is an acrylamide polymer.

Virtually any foaming gas can be employed in the present polymer enhanced foam to the extent the gas is substantially chemically inert with respect to the other foam components and with respect to wellbore production or injection equipment. A preferred foaming gas in one which is readily available in the field. Such gases include nitrogen, air, carbon dioxide, flue gas, produced gas, and natural gas. The quality of the polymer enhanced foam product, i.e., the volume percentage of gas in the foam, is typically within a range from about 50% to about 99%, more preferably within a range from about 60% to about 98%, and most preferably within a range from about 70% to about 97%.

Foam generation requires mixing the liquid phase and the foaming gas either at a high velocity or through a small orifice as can be provided by any conventional artificial foam generator. The liquid phase is preferably preformulated by dissolving the surfactant and polymer in the aqueous solvent prior to foam generation. The foam is then generated by any number of ways. For example, the foam can be generated at the surface by passing the liquid phase and foaming gas through a foam generator and delivering the resulting foam to the wellbore for injection therein. Alternatively, the foam is generated at the surface by coinjecting the foaming gas and liquid phase into the wellbore across an injection tee acting as a foam generator. In another alternative, the foam is generated downhole prior to injection into the formation by coinjecting the gas and liquid phases via a common tubing string or separate tubing strings into the production wellbore and passing the two streams through a downhole foam generator.

The pH of the liquid phase in the polymer enhanced foam is generally within a range of about 4 to about 10, and preferably within a nearly neutral range of about 6 to about 8. In most cases, the pH of the liquid phase inherently falls within the above-recited range without any pH adjustment thereof. However, should the pH of the liquid phase be outside the desired range, the pH can be adjusted during foam generation in accordance with conventional oilfield procedures to achieve a desired pH range. The pH adjustment can be made in any manner known to the skilled artisan. Nevertheless, it has been found that the present process is relatively insensitive to the pH of the liquid phase.

Placement of the polymer enhanced foam in the subterranean hydrocarbon-bearing formation encompasses injection of the foam components into the liquid hydrocarbon production wellbore penetrating the formation, as related above. Although the present wellbore is termed a "liquid hydrocarbon production wellbore" throughout the description, it is understood that pursuant to the present process the wellbore may be temporarily employed as an injection wellbore for placement of the foam in the formation, but the wellbore is functionally restored to a liquid hydrocarbon production wellbore upon the completion of foam placement. Accordingly, liquid hydrocarbon production from the wellbore is temporarily interrupted during the foam injection step of the present process.

The formation penetrated by the wellbore is characterized as having a liquid hydrocarbon producing zone in direct fluid communication with the production wellbore by conventional means such as perforations placed in the wellbore casing at the vertical position of the producing zone. The formation additionally has a gas cap overlying the producing zone and vertical flowpaths that permit gas cap gas to flow across the producing zone into the production wellbore. The vertical flowpaths comprise either gas-permeable matrix or anomalies, the anomalies most commonly being vertical fractures or vertical fracture networks. The vertical flowpaths can be present at any location between the gas cap and the wellbore, including in intervening regions, if any, between the gas cap and producing zone, in the gas cap adjacent to the producing zone or intervening region, or in the producing zone adjacent to the gas cap or intervening region. As is apparent, it is desirable in accordance with the present invention to place the polymer enhanced foam within the vertical flowpaths which undesirably facilitate gas coning.

A degree of selective placement of the foam in overlying gas-permeable matrix or anomalies making up the vertical flowpaths is provided by the specific density characteristics of the polymer enhanced foam employed herein. In general, the foam is formulated to have a relatively lower density than the liquids residing in the producing zone, yet preferably has a higher density than the gas residing in the gas cap. As such, when the polymer enhanced foam enters the producing zone across the casing perforations of the liquid hydrocarbon production wellbore, the foam tends to preferentially flow upward through the formation into the vertical flowpaths, driven by the density differential between the foam and resident liquids. It is also desirable to distribute the foam radially outward within the overlying matrix or anomalies, thereby placing a horizontal foam lens between the gas cap and the liquid hydrocarbon producing zone to substantially prevent the gas cap gas from circumventing the foam blockage to reach the wellbore and inhibit liquid hydrocarbon production.

Placement of the foam is further facilitated by the relatively high shear thinning properties of the polymer enhanced foam. The polymer enhanced foam exhibits relatively high viscosities under low shear conditions at the surface and in the relatively low shear regions of the formation where the foam is desirably placed, which are beyond the near wellbore region of the formation. The near wellbore region is defined herein as the region of the formation which extends radially outward to about 2 meters from the wellbore in the producing zone. The polymer enhanced foam, however, exhibits relatively low effective viscosities under the high flow rate, high pressure gradient for flow and high shear rate conditions encountered in the near wellbore region during the injection step due to the ability of the foam to highly shear thin.

Thus, the high shear thinning ability of the foam results in relatively good injectivity of the foam into the formation with a minimum of injectivity reduction. Nevertheless, once the polymer enhanced foam is successfully placed in the gas-permeable matrix or anomalies away from the near wellbore region, it beneficially shear thickens, thereby achieving a sufficient degree of structure and a sufficient critical pressure gradient for flow to render the polymer enhanced foam an effective gas blocking agent.

The character of the region of the formation in which it is desired to place the foam can influence the selection of a specific foam composition. In general, placement of a polymer enhanced foam in less permeable matrix preferentially dictates selection of a polymer enhanced foam having relatively limited structure, whereas a polymer enhanced foam having a greater degree of structure can be selected for placement in more permeable anomalies. The degree of structure of the polymer enhanced foam formulated in the manner of the present invention is primarily a function of the polymer properties and polymer concentration.

In general, the degree of structure of a polymer enhanced foam containing an acrylamide polymer is increased by increasing the polymer concentration of the liquid phase. However, a more cost-effective and often preferred means for achieving the same effect is to employ a higher molecular weight polymer or, alternatively, a polymer having a higher degree of hydrolysis at a relatively fixed concentration. Conversely, a reduction in the degree of structure can often be achieved by using a lower molecular weight polymer or, alternatively, one having a lower degree of hydrolysis. Thus, the skilled practitioner can modify the degree of structure of the present polymer enhanced foam in the above-described manner to correspond with the permeability of the region of the formation in which the foam is to be placed.

As is apparent from above, a parameter in the performance of the polymer enhanced foam as a gas blocking agent is its critical pressure gradient for flow, which can alternatively be termed yield pressure. As the gas cap gas flows by means of a gas coning mechanism from the gas cap to the production wellbore and surrounding near wellbore region of the producing zone, the gas encounters a gas flow pressure gradient. It is desirable that the foam occupying the matrix or anomalies, across which the gas must flow to reach the production wellbore, exhibits a critical pressure gradient for foam flow higher than the gas flow pressure gradient. Where variable gas flow pressure gradients are encountered, as in radial or point source flow, it is desirable that the critical pressure gradient for flow exceeds the minimum gas flow pressure gradient encountered in the treatment region. By satisfying this criteria, the gas is unable to mobilize the foam and displace it from the matrix or anomalies. Consequently, the foam performs as an effective gas blocking agent in accordance with the present invention.

Relative to conventional polymer-free oilfield foams, the polymer enhanced foam is highly stable and resistant to flow. The polymer enhanced foam is stable over a wide range of temperatures, pressures, and formation water salinities and hardness. The polymer enhanced foam is also relatively stable in the presence of liquid hydrocarbons, resisting collapse and fluid drainage. The foam can be self healing so that if some foam degradation occurs, the foam is capable of reforming itself as it begins to flow through the formation. Thus, placement of the foam in desired regions of the formation provides long-term gas blockage of vertical flow paths to the production wellbore, thereby substantially reducing gas coning when liquid hydrocarbon production is resumed after foam injection is terminated and the foam is fully in place within the formation. Nevertheless, the formation can be restored to its original condition, if desired, by injection of a conventional breaker into the formation to degrade the foam or polymer in situ.

Embodiments of the present process have been described above wherein, the polymer enhanced foam is generated prior to placement of the foam in the formation. However, other embodiments exist within the scope of the present invention, wherein the polymer enhanced foam is generated in situ simultaneous with placement of the foam in the formation. In such cases, the restricted flow paths within the formation matrix or formation fractures act as a natural foam generator. In one such embodiment, the liquid phase and foaming gas are sequentially injected into the liquid hydrocarbon production wellbore with the liquid phase preferably preceding the foaming gas. This sequence enables the higher-mobility trailing gas slug to overtake and finger through the leading liquid slug as the injected fluids are displaced into the formation away from the wellbore. Passage of the gas and liquid phases through the pore throats of the matrix or fracture constrictions desirably results in foam formation. The volume of the liquid and gas slugs injected into the wellbore can be relatively small, but repetitive, to optimize utilization of the surfactant.

In another embodiment, the liquid phase and foaming gas are coinjected into the production wellbore via a common tubing string or separate tubing strings. Foam formation occurs in the formation as the simultaneously coinjected gas and liquid phases pass through the matrix pores or fracture constrictions.

In yet another embodiment, the liquid phase is the only fluid placed in the formation via the production wellbore. When liquid hydrocarbon production is resumed in the wellbore, gas cap gas flowing through the formation toward the wellbore as the result of gas coning tends to finger through the liquid phase. Passage of the gas and liquid phases through the pore throats of the matrix or fracture constrictions results in foam formation in the same manner as described above.

The following examples demonstrate the practice and utility of the present invention, but are not to be construed as limiting the scope thereof.

EXAMPLE 1

A sample of a polymer enhanced foam and a sample of a conventional oilfield foam that is substantially identical in composition to the polymer enhanced foam except for the absence of a polymer component are prepared to compare the stability, and in particular the resistance to physical collapse and water drainage, of the two foams. The liquid phase of both foams is made up of a fresh water solvent containing 1000 ppm of a $C_{12-15}$ ethoxylated sulfate surfactant. The liquid phase of the polymer enhanced foam, however, is further enhanced with an unhydrolyzed polyacrylamide at a concentration of 7000 ppm. The molecular weight of the polymer is 11,000,000.

Foam samples are separately generated by flooding a sandpack under identical conditions with one of the above-recited liquid phases and a gas phase consisting of $N_2$. The sandpack has a permeability of 67 darcies, a length of 30 cm and a diameter of 1.1 cm. All flooding is conducted at 170 kPa constant differential pressure across the sandpack. The polymer enhanced foam propagates at a frontal advance rate of 207 m/day and exhibits an average apparent effective viscosity within the sandpack of 89 cp, while the conventional foam propagates at a frontal advance rate of 8230 m/day and exhibits an average apparent effective viscosity of only 2 cp at the same differential pressure.

Figure 1B:
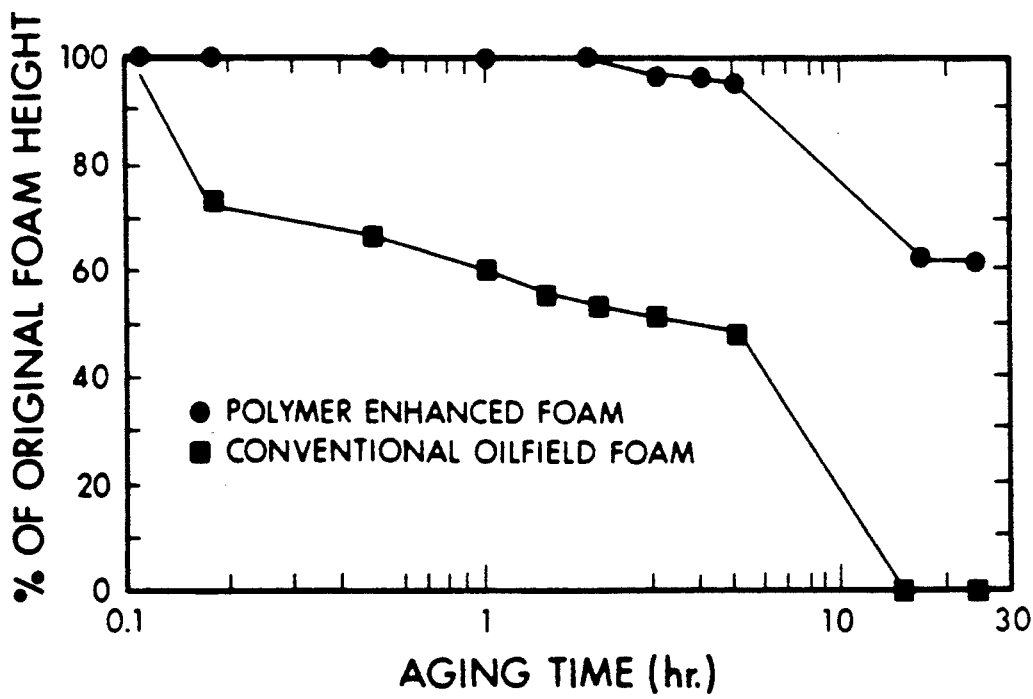
FIG. 1b is a graph comparing the rate of foam collapse of a polymer enhanced foam of the present invention and a conventional oilfield foam as described in Example 1.

A 100 cc sample of each foam is collected as an effluent from the sandpack and placed in a stoppered graduated cylinder for aging at ambient temperature. The position of the foam/water and foam/air interfaces in the graduated cylinders are measured as a function of time to determine the rates of water drainage and foam collapse, respectively for each of the samples. The results are shown in FIGS. 1a and 1b, respectively. It is apparent therein that the rates of water drainage and foam collapse are much greater for a conventional foam than a polymer enhanced foam. Thus, this example shows that the polymer enhanced foam is more stable and more viscous than the conventional oilfield foam.

EXAMPLE 2

A sandpack is flooded with a series of polymer enhanced foam samples, differing only in the foam quality of each sample, to determine the relation between foam quality and apparent viscosity for the polymer enhanced foam of the present invention. The sandpack has a length of 30 cm and a permeability of 150 darcies. All flooding is conducted at 340 kPa constant differential pressure across the sandpack. The polymer enhanced foam propagates at a frontal advance rate of 150-240 m/day.

The foam is formulated from $N_2$ and a synthetic injection water brine solvent containing a $C_{14-16}$ alpha olefin sulfonate surfactant at a concentration of 2000 ppm and a partially hydrolyzed polyacrylamide at a concentration of 7000 ppm. The partially hydrolyzed polyacrylamide has a molecular weight of 11,000,000 and is 30% hydrolyzed. The results are set forth below in Table 1.

TABLE 1

| FOAM QUALITY (%) | AVERAGE APPARENT VISCOSITY (cp) |
|---|---|
| 0 | 150 |
| 57 | 190 |
| 63 | 200 |
| 74 | 210 |
| 80 | 230 |
| 85 | 230 |
| 89 | 240 |

TABLE 1-continued

| FOAM QUALITY (%) | AVERAGE APPARENT VISCOSITY (cp) |
|---|---|
| 93 | 240 |

The results indicate that the performance of the polymer enhanced foam is relatively insensitive to foam quality.

EXAMPLE 3

A sample of a polymer enhanced foam and a sample of a conventional oilfield foam that is substantially identical in composition to the polymer enhanced foam except for the absence of a polymer component are prepared to compare the effective viscosities of the two foams as a function of foam quality. Both foams are formulated from $N_2$ and a synthetic injection water brine solvent having a $C_{14-16}$ alpha olefin sulfonate surfactant dissolved therein at a concentration of 2000 ppm. The synthetic brine contains 5800 ppm TDS and has principle constituents in the following concentrations: 560 ppm $Ca^{++}$, 160 ppm $Mg^{++}$, 1500 ppm $Na^+$, 200 ppm $K^+$, 2200 ppm $SO_4^=$, and 1400 ppm $Cl^-$.

The polymer enhanced foam additionally contains a partially hydrolyzed polyacrylamide at a concentration of 7000 ppm. The partially hydrolyzed polyacrylamide has a molecular weight of 11,000,000 and is 30% hydrolyzed.

A sandpack substantially the same as that of Example 2 is flooded with each foam. The polymer enhanced foam sample is flooded at a differential pressure of 340 kPa and propagates at a frontal advance rate of between about 146 and 213 m/day. The conventional foam sample is flooded at a differential pressure of 136 kPa and propagates at a frontal advance rate of between about 335 and 1460 m/day.

Figure 2:
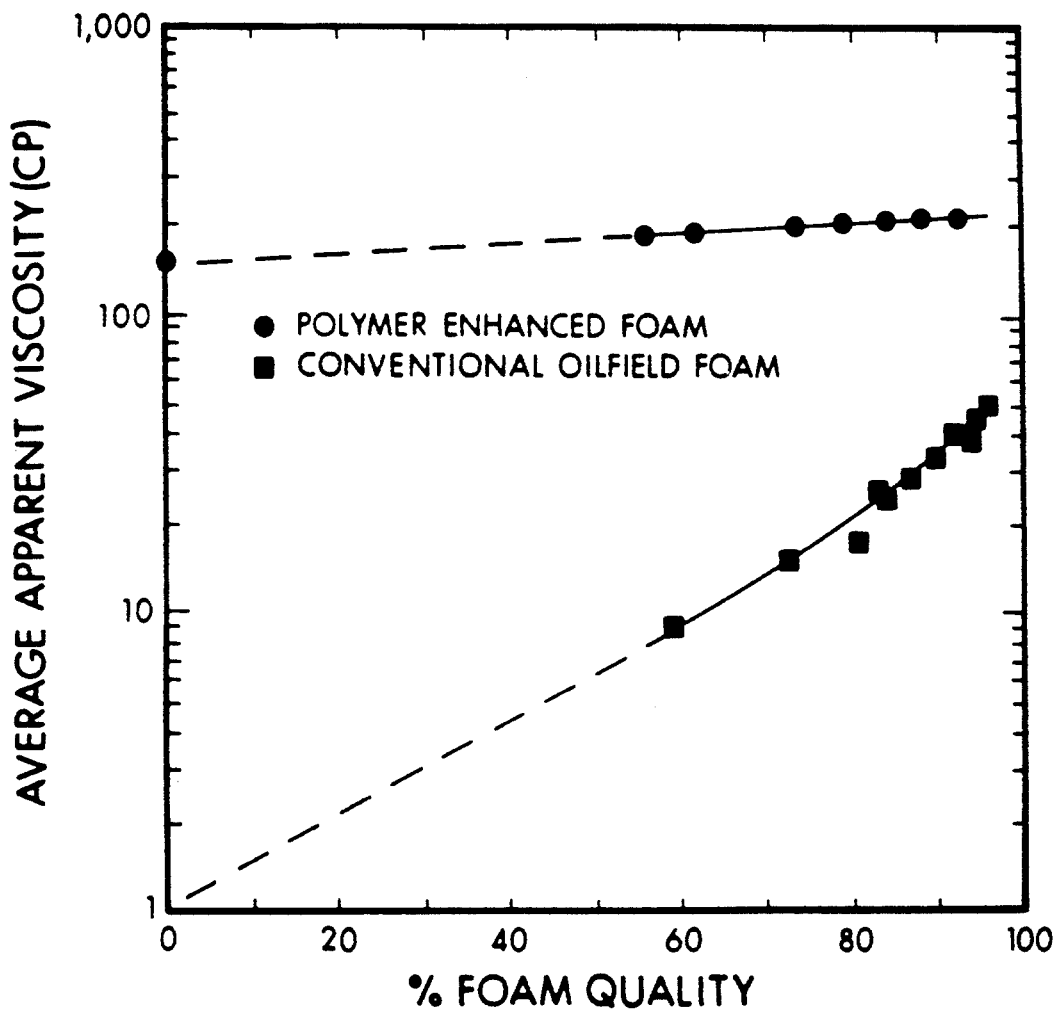
FIG. 2 is a graph comparing foam viscosity as a function of foam quality in a polymer enhanced foam of the present invention and a conventional oilfield foam as described in Example 3.

The results are set forth in FIG. 2 and indicate that the sensitivity of the polymer enhanced foam viscosity to foam quality is much less than that for the conventional foam. Furthermore, the effective viscosity of the polymer enhanced foam at any given foam quality is much greater than that of the conventional foam.

EXAMPLE 4

A sandpack is flooded with a fully formed polymer enhanced foam sample to determine the critical pressure gradient for foam flow. The sandpack has a length of 30 cm and a permeability of 140 darcies. The critical pressure gradient for foam flow is determined to be in the range of 1.34 to 1.56 kPa/cm. The expected gas flow pressure gradient during gas coning is often less than 1.34 kPa/cm suggesting that the polymer enhanced foam is well suited for effective blocking of gas production driven by a gas coning mechanism.

EXAMPLE 5

Two separate floods of a sandpack are conducted at room temperature with 0.2 pore volumes of a fully formed polymer enhanced foam sample followed by 0.8 pore volumes of a brine. In the first flood the sandpack is flushed with a brine immediately prior to foam injection and the sandpack is initially at 100% brine saturation. In the second flood the sandpack is flushed with a brine, saturated with a crude oil, and then flooded with the brine to $S_{or}$ (residual oil saturation) immediately prior to foam injection to demonstrate the stability of the polymer enhanced foam in the presence of crude oil.

The sandpack has a permeability of 150 darcies, a length of 6.1 m and a diameter of 0.46 cm. A constant differential pressure of 680 kPa is applied to the sandpack. The foam is formulated from $N_2$ and the synthetic injection water brine of Example 4, having a $C_{14-16}$ alpha olefin sulfonate surfactant and a partially hydrolyzed polyacrylamide dissolved therein at concentrations of 2000 ppm and 7000 ppm respectively. The partially hydrolyzed polyacrylamide has a molecular weight of 11,000,000 and is 30% hydrolyzed. The foam in the first flood has an apparent viscosity of 43 cp after it has propagated almost entirely through the sandpack, while the foam in the second flood has an apparent viscosity of 50 cp after it has propagated almost entirely through the sandpack. These results suggest that polymer enhanced foam performance is relatively insensitive to hydrocarbons and, thus, the polymer enhanced foam functions well in the presence of crude oil.

While the foregoing preferred embodiments of the invention have been described and shown, it is understood that alternatives and modifications, such as those suggested and others, may be made thereto and fall within the scope of the present invention.

I claim:

1. A process for reducing gas coning into a liquid hydrocarbon production wellbore of a subterranean formation, wherein said wellbore penetrates a liquid hydrocarbon producing zone of said formation in fluid communication with an overlying gas cap, the process comprising:
   placing a polymer enhanced foam in a gas flowpath between said gas cap and said wellbore, wherein said foam comprises a substantially uncrosslinked polymer, a surfactant, an aqueous solvent, and a foaming gas, and wherein said foam substantially blocks the flow of gas cap gas through said flowpath into said wellbore.

2. The process for reducing gas coning of claim 1 wherein said foam has a critical pressure gradient for foam flow greater than a gas flow pressure gradient exhibited by said gas cap gas during gas coning.

3. The process for reducing gas coning of claim 1 further comprising:
   premixing said polymer, surfactant and solvent to form a liquid phase and combining said liquid phase with said foaming gas at the surface to formulate said foam; and
   injecting said foam into said formation via said production wellbore.

4. The process for reducing gas coning of claim 1 further comprising:
   premixing said polymer, surfactant and solvent to form a liquid phase;
   coinjecting said liquid phase and said foaming gas into said wellbore to form said foam; and
   displacing said foam into said formation.

5. The process for reducing gas coning of claim 1 further comprising:
   premixing said polymer, surfactant and solvent to form a liquid phase;
   injecting said liquid phase and said foaming gas into said formation via said wellbore; and
   displacing said liquid phase and said foaming gas through said formation to form said foam.

6. The process for reducing gas coning of claim 5 wherein said liquid phase and said foaming gas are sequentially injected into said formation.

7. The process for reducing gas coning of claim 5 wherein said liquid phase and said foaming gas are coinjected into said formation.

8. The process for reducing gas coning of claim 1 further comprising:
   premixing said polymer, surfactant and solvent to form a liquid phase;
   injecting said liquid phase into said formation via said wellbore; and
   combining said liquid phase with said foaming gas in said formation to form said foam, wherein said foaming gas is said gas cap gas flowing through said formation from said gas cap.

9. A process for reducing gas coning into a liquid hydrocarbon production wellbore of a subterranean formation, wherein said wellbore penetrates a liquid hydrocarbon producing zone of said formation in fluid communication with an overlying gas cap, the process comprising:
   formulating a polymer enhanced foam comprising a substantially uncrosslinked polymer, a surfactant, an aqueous solvent, and a foaming gas by premixing said polymer, surfactant, and solvent to form a liquid phase and combining said liquid phase with said foaming gas to formulate said foam;
   injecting said foam into said formation via said production wellbore; and
   placing said foam in a gas flowpath between said gas cap and said wellbore, wherein said foam substantially blocks the flow of gas cap gas through said flowpath into said wellbore.

10. The process for reducing gas coning of claim 9 wherein said foam has a critical pressure gradient for foam flow greater than a gas flow pressure gradient exhibited by said gas cap gas during gas coning.

11. A process for reducing gas coning into a liquid hydrocarbon production wellbore of a subterranean formation, wherein said wellbore penetrates a liquid hydrocarbon producing zone of said formation in fluid communication with an overlying gas cap, the process comprising:
   premixing a substantially uncrosslinked polymer, a surfactant, and an aqueous solvent to form a liquid phase;
   injecting said liquid phase into said formation;
   combining said liquid phase in said formation with a gas cap gas flowing through said formation from said gas cap to form a polymer enhanced foam; and
   placing said foam in a gas flowpath between said gas cap and said wellbore, wherein said foam substantially blocks the flow of gas cap gas through said flowpath into said wellbore.

12. The process for reducing gas coning of claim 11 wherein said foam has a critical pressure gradient for foam flow greater than a gas flow pressure gradient exhibited by said gas cap gas during gas coning.

13. A process for reducing gas coning into a liquid hydrocarbon production wellbore of a subterranean formation, wherein said wellbore penetrates a liquid hydrocarbon producing zone of said formation in fluid communication with an overlying gas cap, the process comprising:
   placing a polymer enhanced foam in a gas flowpath between said gas cap and said wellbore, wherein said foam consists essentially of a substantially uncrosslinked polymer, a surfactant, an aqueous solvent, and a foaming gas and wherein said foam substantially blocks the flow of gas cap gas through said flowpath into said wellbore.

14. The process for reducing gas coning of claim 13 wherein said foam has a critical pressure gradient for foam flow greater than a gas flow pressure gradient exhibited by said gas cap gas during gas coning.

15. The process for reducing gas coning of claim 13 further comprising:
   premixing said polymer, surfactant and solvent to form a liquid phase and combining said liquid phase with said foaming gas at the surface to formulate said foam; and
   injecting said foam into said formation via said production wellbore.

16. The process for reducing gas coning of claim 13 further comprising:
   premixing said polymer, surfactant and solvent to form a liquid phase;
   coinjecting said liquid phase and said foaming gas into said wellbore to form said foam; and
   displacing said foam into said formation.

17. The process for reducing gas coning of claim 13 further comprising:
   premixing said polymer, surfactant and solvent to form a liquid phase;
   injecting said liquid phase and said foaming gas into said formation via said wellbore; and
   displacing said liquid phase and said foaming gas through said formation to form said foam.

18. The process for reducing gas coning of claim 17 wherein said liquid phase and said foaming gas are sequentially injected into said formation.

19. The process for reducing gas coning of claim 17 wherein said liquid phase and said foaming gas are coinjected into said formation.

20. The process for reducing gas coning of claim 13 further comprising:
   premixing said polymer, surfactant and solvent to form a liquid phase;
   injecting said liquid phase into said formation via said wellbore; and
   combining said liquid phase with said foaming gas in said formation to form said foam, wherein said foaming gas is said gas cap gas flowing through said formation from said gas cap.

* * * * *